United States Patent [19]
Chandler

[11] 3,834,466
[45] Sept. 10, 1974

[54] AGRICULTURAL APPARATUS FOR IRRIGATION PURPOSES

[76] Inventor: Earl E. Chandler, Rt. 1, Box 29AB, Florence, Ariz. 85232

[22] Filed: Aug. 6, 1973

[21] Appl. No.: 385,997

Related U.S. Application Data
[63] Continuation-in-part of Ser. No. 251,147, May 8, 1972, abandoned.

[52] U.S. Cl.............. 172/235, 172/245, 172/529, 172/776
[51] Int. Cl............................................ A01b 13/16
[58] Field of Search .............................. 37/91–93; 172/123, 5, 23, 26, 38, 233–235, 236, 237, 528–530, 143, 683, 245, 249, 776

[56] References Cited
UNITED STATES PATENTS

| | | | |
|---|---|---|---|
| 229,484 | 6/1880 | Stanchfield ...................... | 172/249 X |
| 672,752 | 4/1901 | Collins................................ | 172/245 |
| 1,893,131 | 1/1933 | Council et al. ..................... | 172/235 |
| 2,117,669 | 5/1938 | Kennedy et al................. | 172/236 X |
| 2,537,802 | 1/1951 | Thomas .......................... | 172/233 X |
| 2,668,488 | 2/1954 | Shimmon........................... | 172/235 |
| 2,826,132 | 3/1958 | Kirchoff........................... | 172/529 X |
| 3,089,264 | 5/1963 | Davis.................................. | 172/529 |
| 3,726,346 | 4/1973 | Thompson et al.............. | 172/776 X |

*Primary Examiner*—Clifford D. Crowder
*Attorney, Agent, or Firm*—John A. Robertson

[57] ABSTRACT

Apparatus intended for use in working the land immediately adjacent to an irrigation ditch to provide flow channels from the ditch to a plot of furrowed land spaced from the ditch or a plot of unfurrowed land such as used in growing hay or similar crops. The apparatus comprises a frame that is drawn by a tractor and in which is rotatably mounted an assembly of four angularly spaced blades. Mechanism is provided to cause the blade assembly to rotate with an intermittent motion. The blade assembly is adjustable to adapt it to either of the two types of work above described.

9 Claims, 14 Drawing Figures

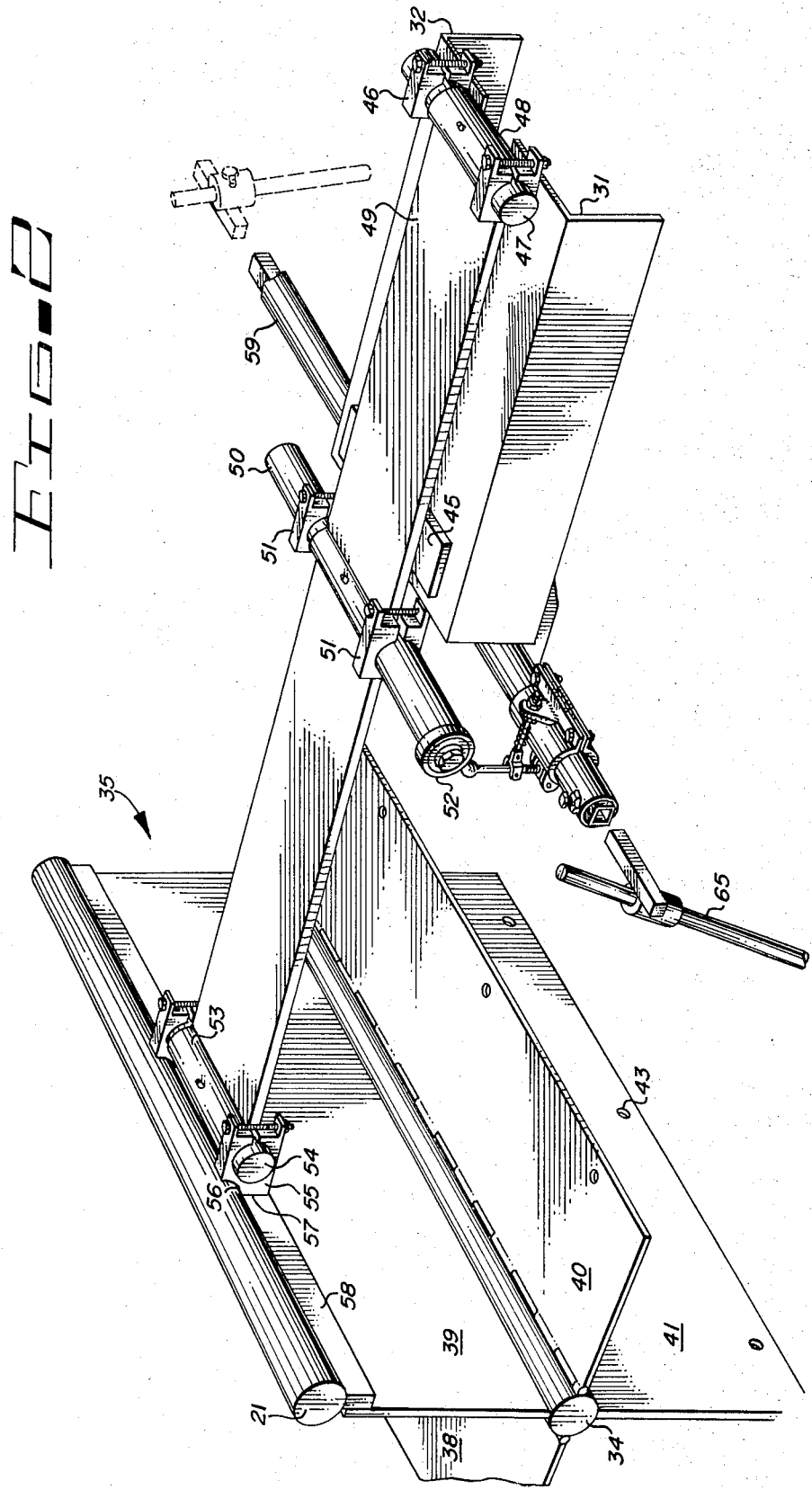

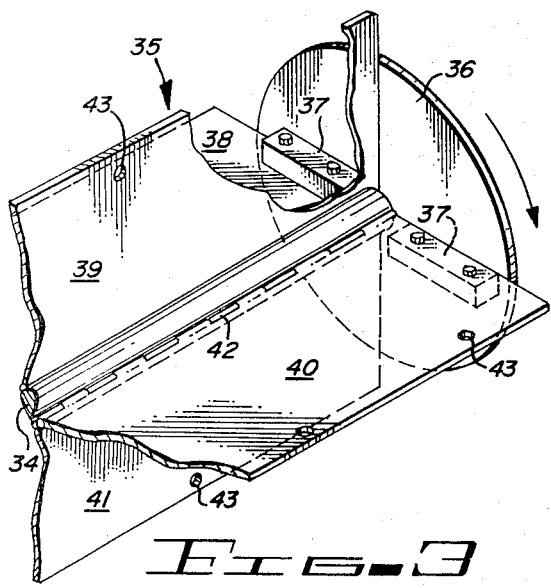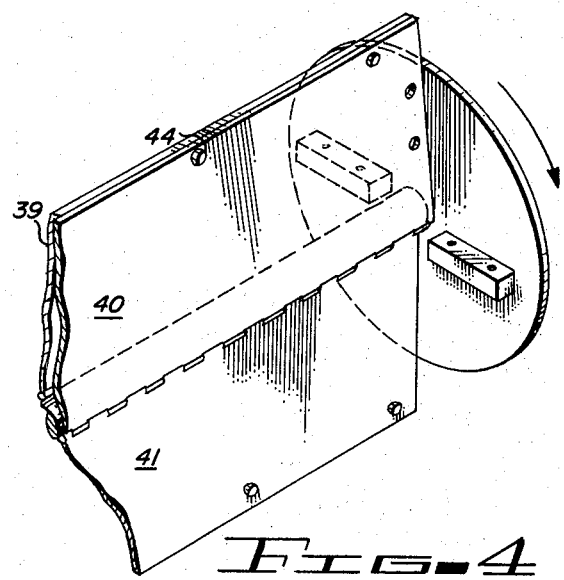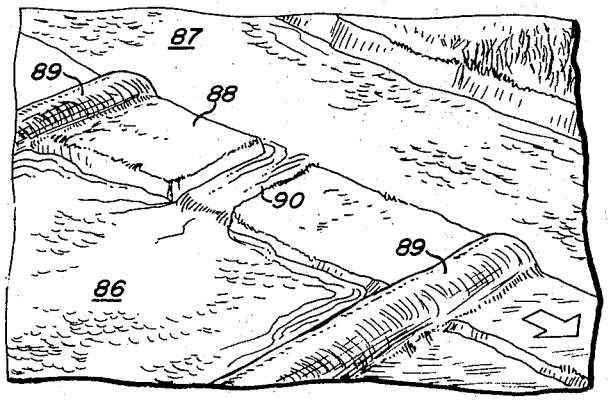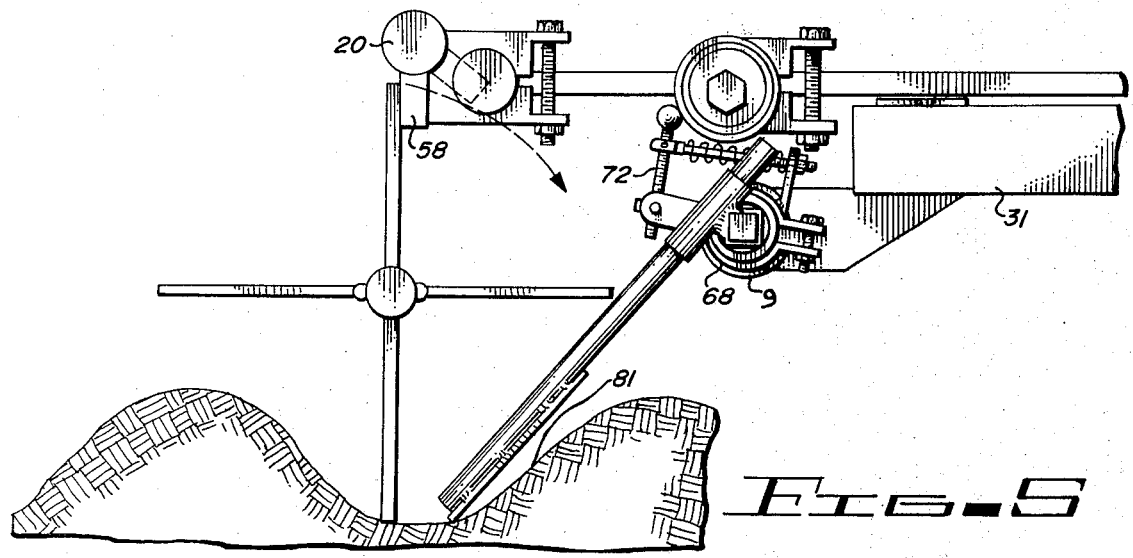

AGRICULTURAL APPARATUS FOR IRRIGATION PURPOSES

This application is a continuation-in-part of the co-pending application of Earl E. Chandler, Ser. No. 251,147, file May 8, 1972, now abandoned, and entitled AGRICULTURAL APPARATUS FOR IRRIGATION PURPOSES.

The present invention relates to apparatus intended to form flow channels between an irrigation ditch and a plot of cultivated land spaced therefrom, and is concerned primarily with apparatus which is particularly for use with a furrowed plot of land, and which is adjustable for use with a piece of unfurrowed land.

BACKGROUND OF THE INVENTION

At the present time, it is common practice for a farmer to cultivate a piece of land by forming furrows therein which are normal to an irrigation ditch with the ends of the furrows more closely adjacent to the ditch being separated therefrom by a border. Obviously, when this piece of land is to be irrigated, provision must be made for water to flow from the ditch to the furrows. Apparatus for accomplishing this purpose is designated by farmers as a rowbucker. It is desirable that channels formed by a rowbucker have a relation to the furrows in which they are substantially aligned therewith.

Plots of unfurrowed land adjacent to an irrigation ditch are often used to raise such crops as hay or grain and which must be irrigated. A piece of equipment known as a border bucker works the border of such a piece of land immediately adjacent to an irrigation ditch to form spaced ridges or mounds which are normal to the ditch and which control the flow of water from the ditch to the plot of unfurrowed land.

OBJECTS OF THE INVENTION

With the foregoing conditions in mind, the present invention has in view the following objectives:

1. To provide agricultural apparatus of the type noted which is workable on a border which separates an irrigation ditch from a plot of land having furrows therein normal to the ditch to form flow channels from the ditch to the furrows.

2. To provide, in apparatus of the character noted, a frame which is drawn by a tractor and in which is rotatably mounted a blade assembly including four angularly spaced blades which work on the ground.

3. To provide, in apparatus of the character aforesaid, mechanism which causes said blade assembly to rotate with an intermittent motion and which is controlled by the furrows.

4. To provide, in apparatus of the kind described, new and improved mechanism for causing such intermittent motion.

5. To provide apparatus of the type noted above which may be readily converted for use with a piece of land terminating at an irrigation ditch to form spaced ridges or mounds of earth normal to said ditch and extending into said piece of land.

Various other more detailed objects and advantages of the invention such as arise in connection with carrying out the above ideas in a practical embodiment will, in part, become apparent, and, in part, be hereafter stated as the description of the invention proceeds.

SUMMARY OF THE INVENTION

The foregoing objects are achieved by providing a frame which is drawn by a tractor and in which is rotatably mounted a blade assembly comprising a pair of spaced end discs with four angularly spaced blades extending therebetween. Mounted on the frame is a detent which is adapted to engage the upper edge of the blade in the uppermost position to hold the assembly against rotation. A lock bar comprising two hingedly connected sections is pivotally mounted at one end in the frame and its other end is pivoted to the detent. A device for raising the hinge connection of the lock bar sections out of dead center which is the holding position of the lock bar is carried by a shaft which is journalled in the frame and on one end of which is adjustably mounted a paddle that is located laterally beyond the blade assembly and which engages a furrow to rotate the shaft to raise the lock bar hinge from its blade holding position.

The blade assembly includes two fixed blades in diametrically opposed relation and two blades which are pivotally mounted at their inner ends so that they may be either fixed in position angularly intermediate the fixed blades to provide four effective blades or secured to the fixed blades to provide only two effective blades.

For a full and more complete understanding of the invention, reference may be had to the following description and the accompanying drawings wherein:

FIG. 2 is a detailed perspective of a portion of the blade assembly, the lock bar and mechanism associated therewith;

FIG. 3 is a detailed perspective of one end of the blade assembly in one position;

FIG. 4 is a perspective similar to FIG. 3 illustrating an adjusted position of the blade assembly;

FIG. 5 is a detailed side elevation with parts shown in section of the blade assembly, lock bar and associated mechanism, and depicting the relation to a furrowed piece of ground;

FIG. 9 is a perspective of a side portion of a plot of unfurrowed land and an irrigation ditch immediately adjacent thereto;

DESCRIPTION OF THE PREFERRED EMBODIMENT

Figure 1:
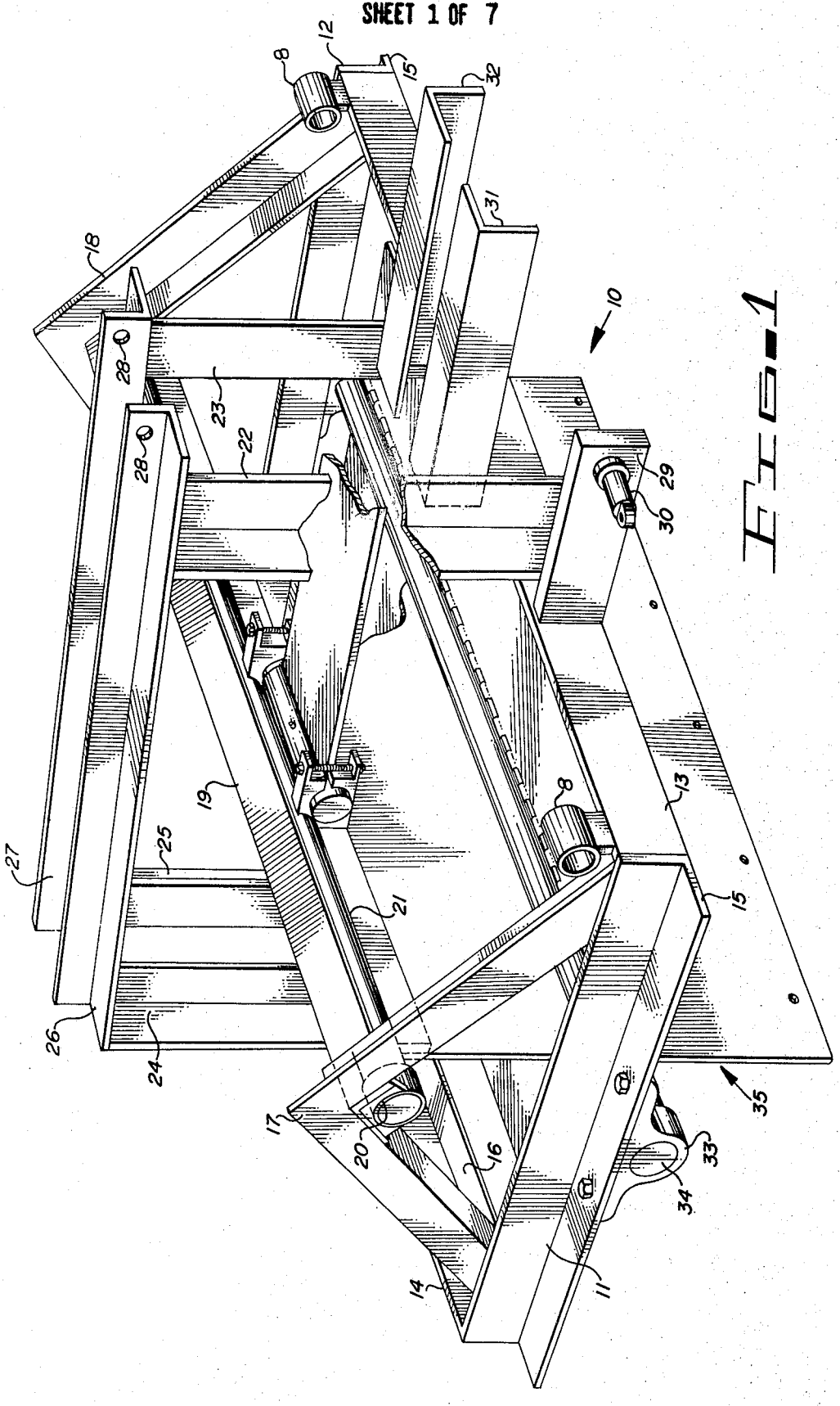
FIG. 1 is a perspective of the frame and a portion of the blade assembly mounted therein.

Referring now to the drawings wherein like reference characters denote corresponding parts, and first more particularly to FIG. 1, a frame is designated generally 10. Frame 10 comprises a pair of end angle irons 11 and 12, a front bar 13 and a rear bar 14. Angle irons 11 and 12 present outwardly extending horizontal flanges 15, while front bar 13 and rear bar 14, which also are angle irons, present inwardly extending flanges, one of which is shown at 16.

Upstanding from end angle iron 11 is an A-frame 17, the lower ends of which are secured to flanges 16 at the adjacent ends of bars 13 and 14. A second A-frame 18 is similarly mounted on end angle iron 12 and the adjacent ends of bars 13 and 14. Extending between the underside of the apices of A-frames 17 and 18 is an angle iron 19, to each end of which is secured a bearing sleeve 20. A shaft 21 has its ends rotatably received in sleeve 20.

A pair of vertical struts 22 and 23 which also are angle irons have their lower ends secured to front bar 13 as by welding and a second pair of vertical struts 24 and 25 have their lower ends secured to rear bar 14. These vertical bars considered as an entity are positioned centrally between the ends of frame 10. A top beam 26 is secured to the upper ends of struts 22 and 24 as by welding, and a second top beam 27 is secured to the upper ends of struts 23 and 25 as by welding. Beams 26 and 27 are angle irons and the vertical flanges thereof are formed with openings 28 which are used in anchoring a towing element which extends from a tractor to the frame. A pair of tongues, one of which is shown at 29, have their inner ends secured to the vertical flange of front bar 13 as by welding, and each tongue 29 carries a bolt 30. These bolts 30 are also used in connecting a towing member from a tractor to the frame 10.

A pair of horizontal supporting members 31 and 32 have their inner ends anchored to vertical struts 22 and 23 as by welding. A bearing 33 is secured to the underside of flange 15 of end angle iron 11 and a similar flange, not illustraeted, is secured to the underside of the flange 15 of end angle iron 12. A shaft 34 has its ends journalled in the bearings 33. A blade assembly identified in its entirety by the reference character 35 is mounted on shaft 34.

Referring now more particularly to FIGS. 3 and 4, blade assembly 35 comprises a pair of end discs 36 (only one of which is illustrated) which are keyed to shaft 34. Mounted on the inner face of each end disc 36 are a pair of blocks 37 in diametrically opposed relation. As more clearly shown in FIG. 2, blade assembly 35 includes four blades 38, 39, 40 and 41. When the apparatus is used as a rowbucker, blades 38, 39, 40 and 41 are spaced 90° apart. Blades 38 and 40 are fixed in diametrically opposed relation and, hence, are substantially in alignment. Blades 38 and 40 are pivotally mounted on their inner edges to shaft 34 as indicated at 42.

When the four blades are to be effective, the ends of blades 38 and 40 are bolted to blocks 37. This achieves and maintains the angular spacing of 90° between the blades. It would be noted that each of the blades 38, 39, 40 and 41 is formed adjacent to their outer longitudinal edges with apertures 43.

When the apparatus is to be used as a border bucker, only two blades in alignment are to be effective. Hence, as shown in FIG. 4, blade 40 is swung on its pivotal mounting 42 until its outer edge engages the outer edge of blade 39. Bolts 44 are then passed through aligned openings 43 to secure the blades in this position. In a similar manner, blade 38 is swung downwardly so that its end edge engages with blade 41 to which it is also secured by bolts 44.

Referring now more particularly to FIG. 2, a cross piece 45 spans the horizontal supports 31 and 32, being secured to the upper faces of the horizontal flanges of the angle irons which constitute supports 31 and 32. Secured to the forward ends of these horizontal flanges of supports 31 and 32 by clamps 46 is a stub shaft 47 which is received in a collar 48 anchored to one end of a lock bar 49. Thus, lock bar 49 is pivotally mounted at its forward end on its supports 31 and 32.

Figure 10:
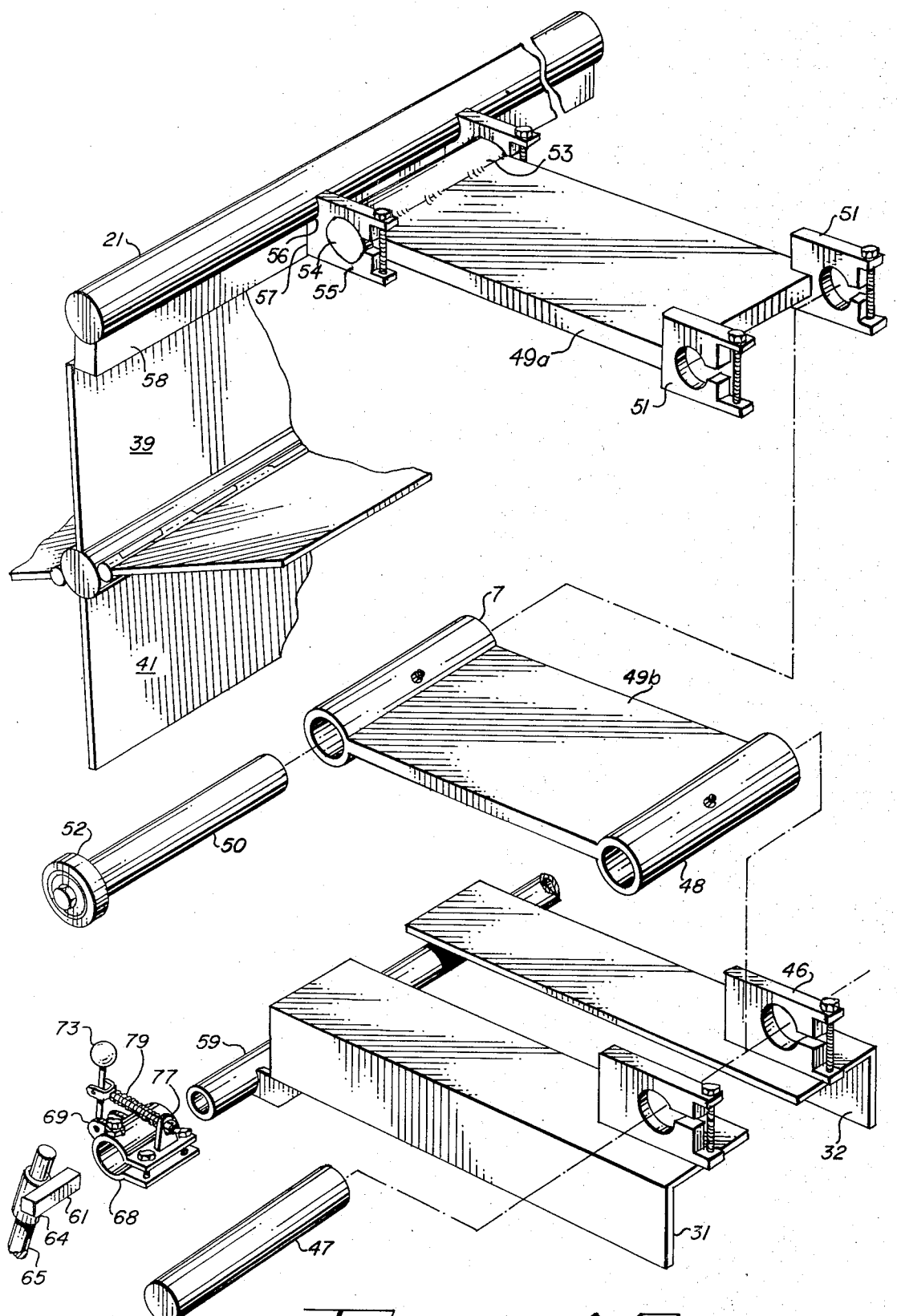
FIG. 10 is a perspective illustrating the detent, lock bar sections and the hinge connection between the lock bar sections in exploded relation.

As illustrated in FIGS. 10–14 inclusive, lock bar 49 comprises two sections 49a and 49b. Sections 49b extends rearwardly over cross piece 45 (FIG. 2) and at its rear end is formed with a sleeve 7. Section 49a carries a pair of clamps 51 at its forward end and these clamps receive therebetween sleeve 7. A rod 50 passes through the aligned clamps and sleeve, with the clamps secured to end portions of the rod. Thus, sleeve 7, rod 50 and clamps 51 constitute a hinge connection between lock bar sections 49a and 49b. A bearing 52 is mounted on one end of rod 50 as shown in FIGS. 2 and 10.

The inner or rear end of lock bar section 49a is formed as a sleeve 53 which receives a shaft 54 which projects at each end beyond sleeve 53 and secured to these projecting portions are so-called stop members 55. Shaft 54 and stop members 55 are secured together to form a unit. Each stop member 55 is formed with a curved notch or recess 56 which snugly receives shaft 21 and is welded thereto. Each stop member 55 also has an end face 57 which is welded to a detent 58 which is either integral with shaft 21 or welded thereto.

Figure 11:
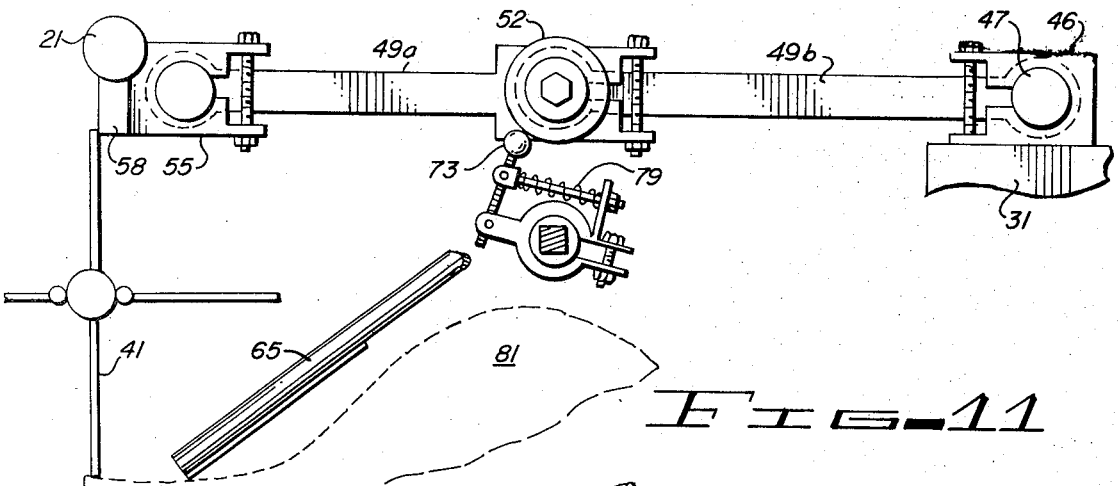
FIG. 11 is a side elevation of the blade assembly, the detent, lock bar, and tripping device for the lock bar, and depicting the hinge connection between the lock bar sections in "dead center" which is the holding position of the lock bar.
Figure 12:
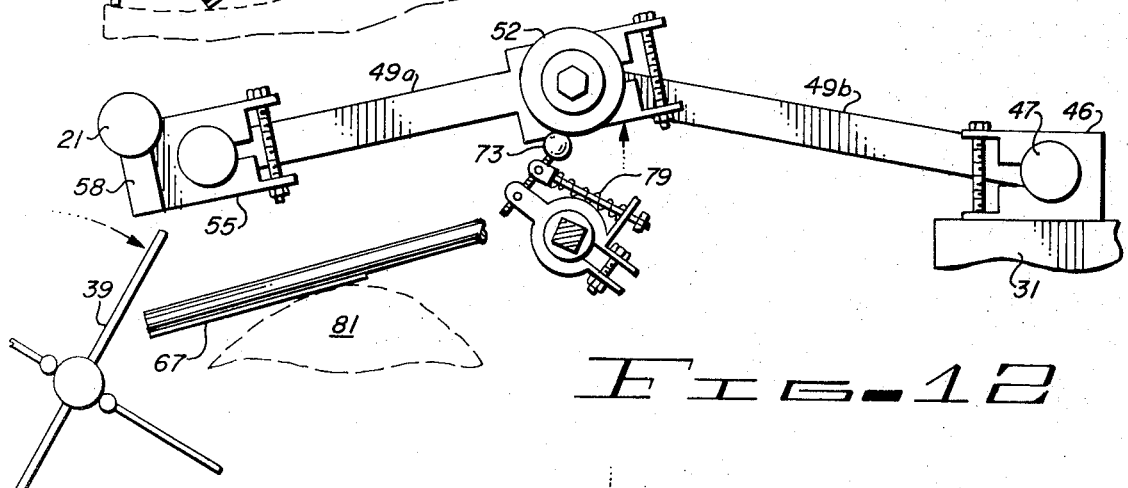
FIG. 12 is a side elevation similar to FIG. 11, illustrating the hinge connection between the lock bar sections as raised from its "dead center" position by the tripping device.
Figure 13:
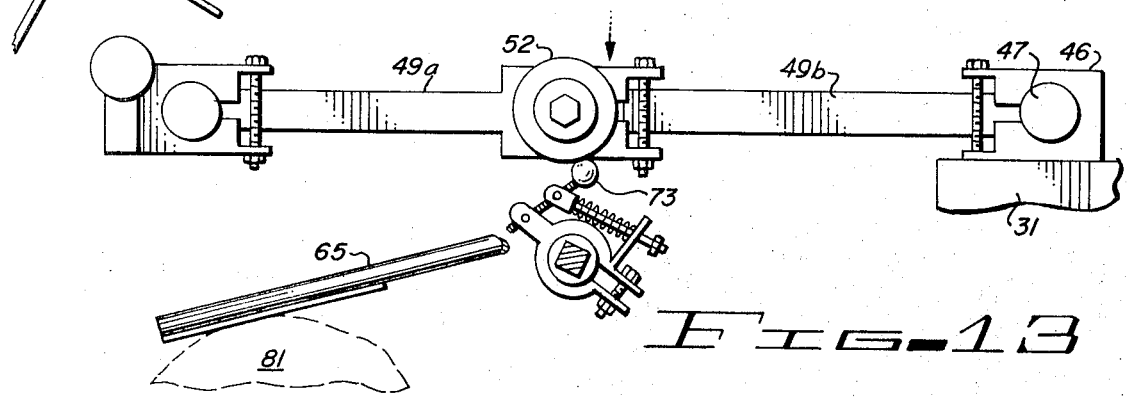
FIG. 13 is a side view similar to FIGS. 11 and 12, showing the position of the tripping device immediately after the lock bar sections have fallen down to their original positions.

It is notable that blade assembly 35 is a heavy, massive structure. Thus, when the lower edge of the lowermost blade 41 as depicted in FIG. 2 engages the ground surface and frame 10 is pulled forwardly, that is to the right speaking with reference to the showing of FIG. 2, the upper edge portion of the uppermost blade 39 bears against detent 58 with a high degree of pressure. However, this pressure is adequately resisted by lock bar 49 when the two sections 49a and 49b thereof are in alignment, as illustrated in FIGS. 2 and 11. In this condition of alignment, the hinge connection typified by rod 50 is in a dead center position. However, when this hinge connection is deflected upwardly as depicted in FIG. 12, by tripping mechanism to be later described, the pressure of the upper edge portion of blade 39 on detent 58 will cause this detent to swing on shaft 21 as an axis into the position of FIG. 12 and permit blade 39 to clear the detent, whereupon it is rotated in a clockwise direction, due to the fact that lowermost blade 41 engages the ground surface and the tractor is moving forwardly.

Figure 7:
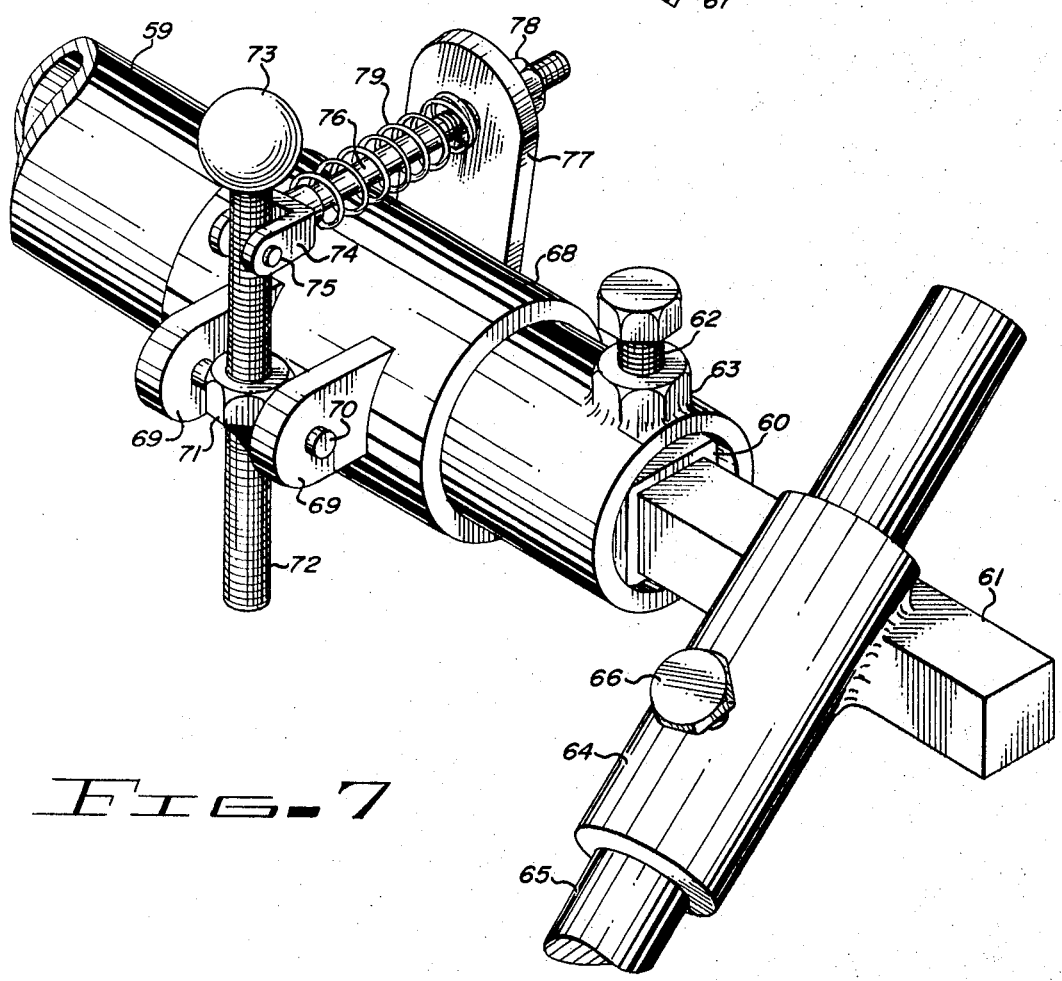
FIG. 7 is a detailed perspective on an enlarged scale of the mechanism which operates the lock bar.
Figure 8:
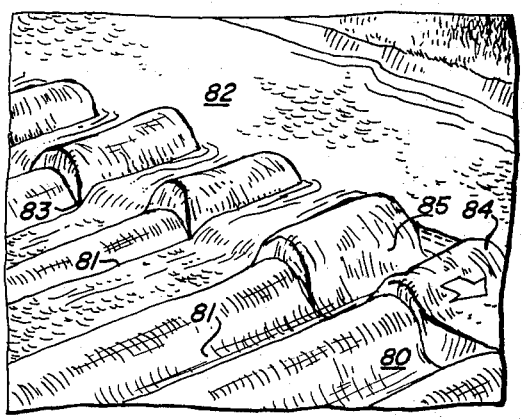
FIG. 8 is a perspective illustrating a side portion of a piece of furrowed land and an irrigation ditch therefor.

A tubular shaft 59 is journalled in bearings 9 on the rear ends of supports 31 and 32 and in sleeves 8 secured to the ends of front bar 13 of frame 10. Referring now to FIG. 7, a hollow tube 60 of square cross-section is fixedly secured in each end of tubular shaft 59 in any preferred manner, such as by press-fit or by welding. A solid rod 61 of square cross-section corresponding to the inner dimensions of hollow tube 60 is slidably received in the latter. A set screw 62 is screwed into a nut 63 welded to shaft 59 and passes through aligned openings (not illustrated) in shaft 59 and tube 60 so that its inner end engages rod 61 to hold the latter in an adjusted position relative to shaft 59.

Figure 6:
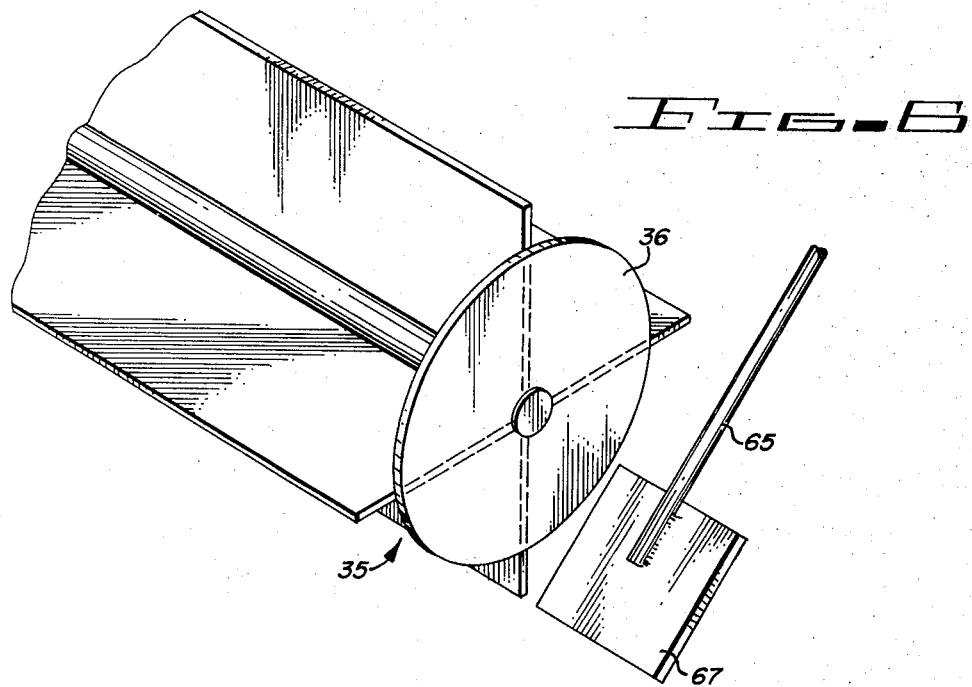
FIG. 6 is a perspective of one end of the blade assembly and the paddle which is associated with that end.

Mounted on rod 61 is a sleeve 64 which slidably receives a bar 65 with an adjusted position being secured by a lock screw 66. As shown in FIG. 6, the lower end of this bar 65 carries a paddle 67 which is located laterally beyond or outside of the adjacent end disc 36 of blade assembly 35. Paddle 67 rides over furrows in a piece of land as will be later described, and as illustrated in FIG. 5.

At this point, it is well to note that paddle 67 is located beyond one end of blade assembly 35 with the end being determined by the direction in which the tractor pulls the frame 10. Thus, FIG. 2 shows bar 65 at one end of tubular shaft 59 in full lines, but in broken lines at the other end. This is intended to illustrate that by loosening set screw 62, rod 61 with bar 65 and paddle 67 may be pulled from one end of the shaft 59 and inserted in the other to accommodate movement of the frame in the opposite direction.

Referring again to FIG. 7, a clamp 68 is applied about tubular shaft 59 and extending rearwardly from clamp 68 are a pair of ears 69 between which is journalled a pin 70 carrying a nut 71. A screw stem 72 is threaded in nut 71 and its upper free end is formed as a sperical abutment 73 which engages bearing 52 on rod 50 to move lock bar 49 upwardly when shaft 59 is rotated by paddle 67 engaging a furrow.

A yoke 74 is pivotally mounted on screw stem 72 by a pivot pin 75 and extending from this yoke 74 is a rod 76 which passes through an opening in an ear 77 upstanding from clamp 68. The outer end of rod 76 is threaded and screwed thereonto is a nut 78 which limits movement of yoke 74 relative to ear 77. An expansion coil spring 79 is interposed between yoke 74 and ear 77 to urge abutment 73 outwardly into a position to permit dropping of bearing 52 past the abutment member 73.

OPERATION

The operation of the above apparatus will first be described when used as a rowbucker. That is, in conjunction with a plot of land 80 having furrows 81 which are normal to an irrigation ditch 82 with the ends of the furrows 81 which are shown at 83 being spaced from ditch 82 by a border 84. The subject device is used to form flow channels 85 which align with the ends of furrows 81 and which communicate with ditch 82. In most installations of irrigation ditches, the side walls of the ditch are lined with concrete and siphon tubes conduct water from the irrigation ditch 82 into the flow channels 85.

Assuming that the frame 10 is to be pulled along the border 84 in the direction of the arrow, the paddle 67 is mounted on the proper end of tubular shaft 59 so that it is received in a furrow 81. As the tractor pulls frame 10 in the direction of the arrow, which would be to the right in the showing of FIG. 5, paddle 67 by engaging a furrow 81 rotates shaft 59 to impart a swinging movement to the abutment 73 on the upper end of member 72.

Figure 14:
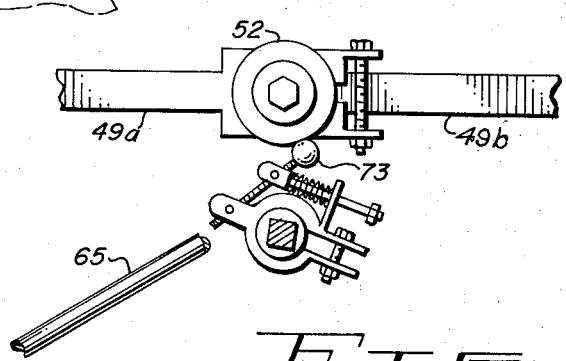
FIG. 14 is a detail side view of the tripping device just before an abutment member included therein is returned to its original position by a spring.

As abutment 73 is moved to the right from the position illustrated in FIG. 11, the hinge connection between lock bar sections 49a and 49b is moved upwardly into the position of FIG. 12. This causes the end of section 49a to move detent 58 into the position of FIG. 12 in which uppermost blade 39 clears the detent under the influence of the pressure generated by the engagement of the lowermost blade 41 with the ground and forward movement of the frame 10 caused by the tractor. As paddle 67 rides over the ridge of furrow 81, the abutment 73 is moved to the right hand side of bearing 52 and as the sections of lock bar 49 fall downwardly under gravity action, bearing 52 engages abutment 73 to initiate compression of spring 79. Continued forward movement of frame 10 causes the paddle 67 to ride down the other side of the furrow ridge which imparts a counter-clockwise movement to shaft 59 which results in a maximum compression of spring 79 as illustrated in FIG. 14. When paddle 65 reaches its lowermost position, spring 79 will expand to move abutment 73 back into the position on the left hand side of bearing 52 as illustrated in FIG. 11 with a snap action. Thus, rotation of the blade assembly 35 causes two adjacent blades to literally walk over ridge 81. Once the ridge is passed, the blade assembly is again held against rotation by engagement of the next blade which would be the blade 38 with the detent 58, because the sections of the lock bar 49 will have again assumed the position illustrated in FIG. 11 in which the hinge connection between the sections is at dead center.

FIG. 9 illustrates a plot of land 86 immediately adjacent to an irrigation ditch 87. Plot 86 is not furrowed and its edge 88 is at the side of ditch 87. When plot 86 is to be irrigated, ridges or mounds 89 are formed in plot 86 adjacent to side edge 88 in spaced relation. After these ridges or mounds are so formed, a trench 90 is formed to admit water from the ditch 87 onto the surface of plot 86. The ridges 89 control the flow of such water.

When the above described apparatus is used as a border bucker to form ridges 89, the condition of the blades depicted in FIG. 4 is achieved in which there are really only two effective blades in diametrically opposed relation. A paddle 67 is mounted on each end of shaft 59. As the frame 10 is drawn along the ground, the edges of the blades in effective position work on the ground with the intermittent motion caused by paddles 67 engaging the end portions of ridges 89 to elevate the end of lock bar 49 past dead center.

It is to be understood that the ridges 89 of FIG. 9 have a length equal to the extent of the plot 86 away from ditch 87. Thus, after frame 10 has been pulled by a tractor to make one pass in a direction parallel to ditch 87, its direction of travel is reversed to make a second pass adjacent to the first to form continuations of those portions of ridges 89 formed by the first pass, and so on, until the ridges are completed to their full extent.

To form the ridges on the first pass, the end of lock bar 49 is raised manually. For all successive passes, the operation is automatic as one of the paddles 67 engages the end portion of a formed ridge.

While a preferred specific embodiment is herein disclosed, it is to be clearly understood that the invention is not to be limited to the exact constructions, mechanisms and devices illustrated and described, because various modifications of these details may be provided in putting the invention into practice.

What is claimed is:

1. In agricultural apparatus for forming flow channels between an irrigation ditch and a plot of land having furrows extending in a direction normal to said ditch, said apparatus comprising:
   a. a frame adapted to be pulled by a tractor;
   b. a blade assembly rotatably mounted in said frame and including a pair of spaced apart end discs, a shaft journalled in said frame and four angularly spaced blades carried by said shaft;
   c. a detent rotatably mounted in said frame in position to be engaged by the upper edge of a blade to hold said blade assembly against rotation;
   d. a lock bar comprising two hingedly connected sections, with one end of one section pivotally mounted on said frame and one end of the other section pivoted to said detent;
   e. a shaft mounted for rotation on said frame in advance of said blade assembly and extending in a direction parallel to said blade assembly;
   f. an abutment member drivably mounted on said last mentioned shaft and swingable upon rotation of said shaft to move the hinge connection of said lock bar upwardly, and
   g. a paddle detachable at one end of said last mentioned shaft and in driving relation therewith, said paddle being positioned laterally of said blade assembly whereby engagement of a furrow by said paddle imparts rotation to said last mentioned shaft.

2. The apparatus of claim 1 in which a pair of alternate blades are fixed in diametrically opposed relation on said first mentioned shaft and the other pair of alternate blades are hingedly mounted on said shaft, together with means for securing the ends of said hingedly mounted blades to said end discs in position in which said blades are angularly spaced 90°, and means for securing each of said hingedly mounted blades to one of said fixed blades, whereby said blade assembly presents only two effective blades.

3. The apparatus of claim 1 in which said last mentioned shaft is tubular and said paddle is carried at one end of a bar which is adjustably mounted on a rod which adjustably receives one end of said tubular shaft, and means for securing the adjusted position of said rod in said tubular shaft.

4. The apparatus of claim 3 in which said rod is insertable in either end of said tubular shaft.

5. The apparatus of claim 3, together with a clamp on said tubular shaft and in which said abutment member is carried at one end of a screw stem which is adjustably and pivotally mounted on said clamp and spring means normally biasing said abutment member in a position at one side of the hinge connection between the sections of said lock bar.

6. The apparatus of claim 5 in which said spring biasing means comprises a yoke pivoted on said screw stem, an ear ustanding from said clamp and an expansion coil spring between said yoke and ear.

7. The apparatus of claim 1 in which a cross rod is secured to said lock bar intermediate the ends thereof and a bearing is mounted on one end of said cross rod which is engaged by said abutment member.

8. The apparatus of claim 1 in which said frame comprises a pair of end bars, a front bar, a rear bar and a pair of A-frames extending upwardly from said end bars with each A-frame presenting an apex, said detent being rotatably mounted on the underside of said apices, and said first mentioned shaft being rotatably mounted on the underside of said end bars.

9. The apparatus of claim 8 together with a pair of struts upstanding from said front bar, a second pair of struts upstanding from said rear bar, a pair of top beams extending between the upper ends of said struts, and means for attaching a draw element from a tractor to said top beams.

* * * * *